United States Patent Office 3,364,274
Patented Jan. 16, 1968

3,364,274
PREPARATION OF BENZOCORONENE AND INTERMEDIATES
Gilbert Stork, Leonia, N.J., and Ken Matsuda, Stamford, Conn., assignors to American Cyanamid Company, Stamford, Conn., a corporation of Maine
No Drawing. Filed Feb. 8, 1966, Ser. No. 525,823
8 Claims. (Cl. 260—668)

This invention relates to processes for preparation of 1,2-benzocoronene and intermediates.

1,2-benzocoronene exhibits photochromism and is therefore useful in variable transmission devices such as sunglasses, data display and storage systems, photocopying devices, photographic masking, and signal processing.

A known synthesis of 1,2-benzocoronene is a seven step process beginning with perylene. See Clar et al. J. Chem. Soc., 4616 (1957). The method is disadvantageous, however, since the numerous steps add to the expense of the synthesis. Moreover, the intermediates resulting from the various steps must be substantially purified thereby also adding to the cost and inconvenience of the overall process. Further, when the crude yields for each step are combined an overall yield of about 10% can be calculated. It is evident, however, that the overall yield of a product to have sufficient purity for commercial applications will be substantially lower due to the loss of material in the several intermediate purifications required.

A second route to 1,2-benzocoronene proposed by Clar et al. involves the oxidative Diels-Alder condensation of 1,2,4,5-dibenzopyrene with maleic anhydride and chloranil. See Clar et al., J. Chem. Soc., 1577 (1958). This method is not presently feasible since the dibenzopyrene is not readily available.

In accordance with the present invention 1,2-benzocoronene is prepared by a process having the advantages of only three steps, preparation from a readily available starting material, and good purity in each intermediate without resorting to inconvenient purification techniques. The ultimate benefits are convenience, improved overall yield, and reasonable cost.

In one aspect the process of the invention is the reaction of perylene and benzyne to form intermediate 1,12-o-phenyleneperylene. In a second aspect the process of the invention is the preparation of 1,2-benzocoronene (III) from perylene proceeding through the intermediate 1,12-o-phenyleneperylene (I) and the further intermediate 1,2-benzocoronene-7,8-dicarboxylic anhydride (II). The overall sequence of reaction may be depicted as follows:

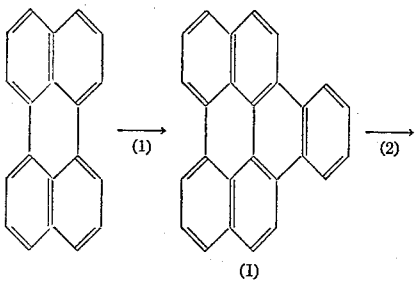

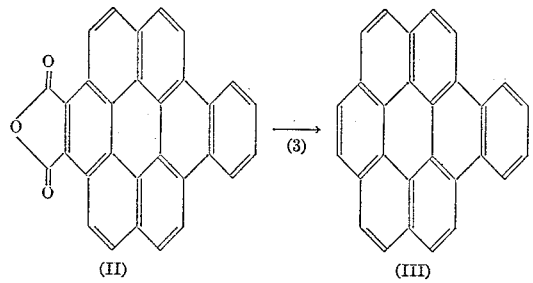

In step (1) above, benzyne is employed in a molar excess, i.e., in the range of from about 2–10 moles of benzyne per mole of perylene, and preferably 3–5 moles of benzyne per mole of perylene. The molar excess of benzyne is required not only for addition to the perylene but also to effect dehydrogenation of the intermediate to the aromatic state. The latter result is surprising since under the mild conditions of the reaction it had been expected that the non-dehydrogenated product would form:

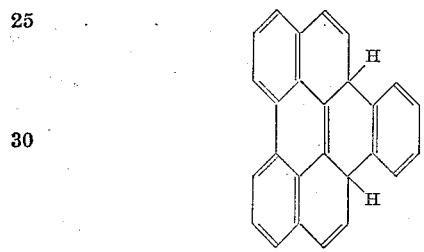

It appears that at least a second mole of benzyne must be present to act as a hydrogen acceptor. The combined condensation and dehydrogenation thus distinguishes the present reaction from known reactions of benzyne with polynuclear hydrocarbons.

The benzyne is conveniently provided in the reaction mixture by in situ generation in a known manner. Illustrative of such reactions to form benzyne are the following:

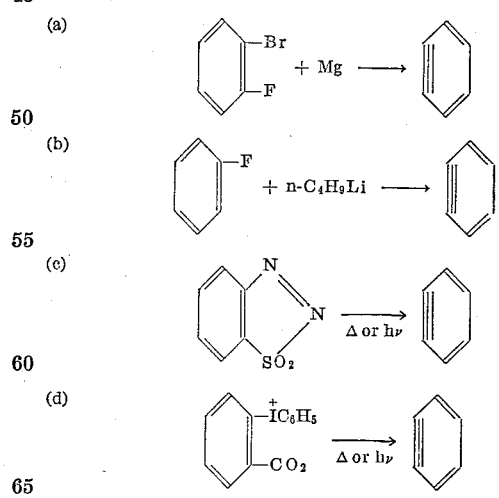

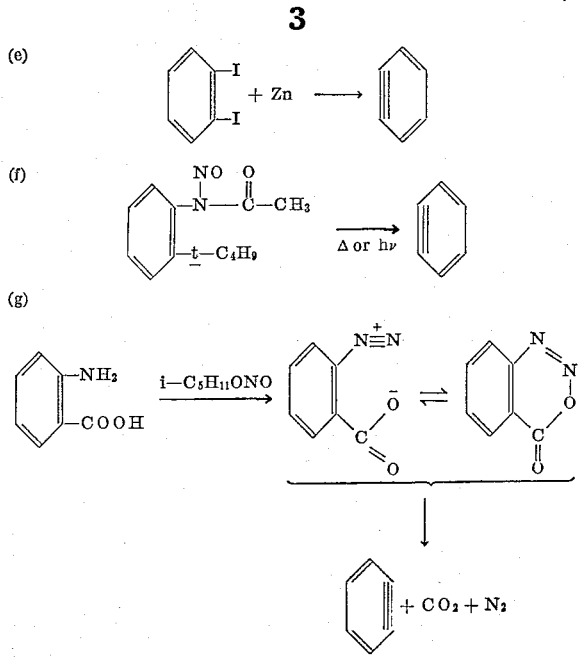

Reactions such as the foregoing are described in R. Huisgen, "Organometallic Chemistry," edited by H. Zeiss, Reinhold Publishing Corp., New York, 1960, pp. 36–87; J. F. Bunnett, J. Chem. Ed., 278 (1961); H. Heaney, Chem. Revs., 62, 81 (1962); Freedman and Logullo, J. Am. Chem. Soc., 85, 1549 (1963). Of the foregoing the method of Freedman and Logullo [reaction g above] is preferred.

The reaction of step (1) is desirably conducted in a solvent medium employing one or a mixture of known solvents for the reactants until reaction is essentially complete. Such solvents include, for example, methylene chloride, acetonitrile, dioxane, and benzene. The temperature of the reaction is not critical and is generally the reflux temperature determined by the boiling point of the solvent. In the case of methylene chloride the preferred temperature will be in the range of about 40–50° C. at atmospheric pressure.

Since benzyne is extremely reactive it should not be present all at once. Hence, it is desirable to add benzyne or its generating antecedents gradually to the perylene.

When the benzyne is generated by the reaction of isoamyl nitrite and anthranilic acid, particularly when solvents boiling higher than methylene chloride are employed, it is preferred to add the anthranilic acid gradually to the solution of isoamyl nitrite and perylene or to add the isoamyl nitrite concurrently with the solution of anthranilic acid to minimize the thermal decomposition of the nitrite or destruction of benzyne by anthranilic acid. The mole ratio of the isoamyl nitrite to anthranilic acid is generally equimolar, preferably with a slight excess of isoamyl nitrite to allow for some thermal decomposition.

The total concentration of reactants to form the benzyne will be such as to provide amounts effective for reaction with perylene as described above. Product 1,12-o-phenyleneperylene is formed as a solid and may be removed from the reaction mixture by filtration. Further separation and purification is unnecessary but may be useful if an intermediate of greater purity is desired.

In step (2) of the process, the separated 1,12-o-phenyleneperylene of step (1) is reacted with maleic anhydride in the presence of a dehydrogenating agent to form 1,2-benzocoronene-7,8-dicarboxylic anhydride. At least equimolar amounts of maleic anhydride and step (1) product are employed but excess maleic anhydride is preferred as solvent for the reactants, particularly the dehydrogenating agent. The latter is an oxidizing agent such as chloranil, nitrobenzene, or the like. Chloranil is preferred. For complete solution of chloranil the mole ratio of maleic anhydride to chloranil will be in the range of from about 4–12 moles, preferably 6–9 moles, of maleic anhydride per mole of chloranil.

Step (2) is considered to proceed through two stages: (a) an initial Diels-Alder condensation and (b) subsequent dehydrogenation to produce the aromatic product. Step 2(a) is an equilibrium reaction and effective formation of product therefore requires the simultaneous presence of maleic anhydride and dehydrogenating agent. This may be accomplished by prior admixture of maleic anhydride and dehydrogenating agent or the dehydrogenating agent may be added gradually to a solution of the 1,12-o-phenyleneperylene in the maleic anhydride.

The amount of dehydrogenating agent will be such as required to effect complete dehydrogenation of the initial Diels-Alder adduct [step 1(a)] to the aromatic state. In the case of chloranil at least 3 moles of chloranil per mole 1,12-o-phenyleneperylene will be employed. However, the ratio should not be extremely high since product isolation would be overly difficult. The preferred range is 3.5–6 moles of chloranil per mole of 1,12-o-phenyleneperylene.

Other known reagents and solvents may be employed in step (2) provided they do not interfere with the formation of the 1,2-benzocoronene-7,8-dicarboxylic anhydride intermediate. For example, a small amount of warm nitrobenzene may be added during reaction or at the end to facilitate removal of unreacted maleic anhydride and chloranil.

The reaction of step (2) is preferably conducted at about reflux temperature, i.e., about 200° C., the boiling point of maleic anhydride at atmospheric pressure, until reaction is essentially complete, e.g., about one hour. The solid reaction product is then separated by conventional means, e.g., filtration. Further isolation and purification is unnecessary but may be effected if desired.

In step (3) the 1,2-benzocoronene-7,8-dicarboxylic anhydride resulting from step (2) is decarboxylated to form benzocoronene. Known decarboxylating agents and conditions may be utilized for this purpose. Among these may be mentioned reaction with a molar excess of soda-lime in the range of about 350–450° C., reaction with aqueous potassium hydroxide at 300–350° C. in an autoclave, or heating in the presence of a copper powder catalyst. The amount of decarboxylating agent will be such as to assure good physical contact with the benzocoronene dicarboxylic anhydride.

Except where indicated above the reactions may be batch, continuous or semi-continuous and atmospheric, sub-atmospheric or super-atmospheric pressures may be utilized. Also reactants may be added gradually or all at once except where interfering reaction or decomposition may result. An inert atmosphere is desirably provided in each step.

The invention is further described in the following examples which are not intended to limit the invention except as defined in the appended claims. All parts and percentages are by weight unless otherwise indicated.

EXAMPLE 1

*Preparation of 1,12-o-phenyleneperylene*

To a stirred nitrogen-flushed, refluxing mixture of 1.2 grams (4.8 millimoles) of perylene and 1.85 grams (15.8 millimoles) of isoamyl nitrite in 40 milliliters of methylene chloride, was added dropwise during three hours a solution of 2.0 grams (14.6 millimoles) of anthranilic acid in 11 milliliters of tetrahydrofuran. The dark mixture was stirred under reflux for another 30 minutes and filtered. The infrared spectrum of the separated orange-yellow solid showed it to be mostly 1,12-o-phenyleneperylene as compared with a known sample of the compound. The total conversion of perylene was 63% and yield of 1,12-o-phenyleneperylene based on converted perylene was 66%.

When the reaction was conducted under conditions identical to those used above but with only one-third the amount of benzyne (anthranilic acid plus isoamyl nitrite), the conversion of perylene was only 30% and the yield of 1,12-o-phenyleneperylene based on converted perylene was 61%. The crude filter cake product contained a considerable amount of perylene as determined by infrared analysis. Thus, for good yield, a separate purification step would be required before this material could be used in the next reaction step. Hence, a 3–1 mole ratio of benzyne to perylene is preferred.

EXAMPLE 2

(A) *Preparation of 1,2-benzocoronene-7,8-dicarboxylic anhydride*

A mixture of 0.326 gram (1.0 millimole) of the 1,12-o-phenyleneperylene of Example 1, 1.1 grams of chloranil, and 2.7 grams of maleic anhydride was stirred under reflux for one hour. To this mixture was added 10 milliliters of warm nitrobenzene and the mixture was filtered at about 50° C. The infrared spectrum of the separated brick-red solid (0.294 gram) was consistent with the structure of the expected 1,2-benzocoronene-7,8-dicarboxylic anhydride and yield was 70%.

(B) *Preparation of benzocoronene*

The anhydride from part (A) above (0.164 gram, 0.39 millimole) was ground together with 0.90 gram of soda-lime. The powder was wet with ethanol and ground further. The paste was placed in a porcelain boat which, in turn, was placed inside a suitable reaction tube contained in a horizontal tube furnace. The tube was swept with prepurified nitrogen to prevent oxidation and heated to 100° C. whereupon a tan-colored solid was obtained. An oil pump was connected to the exit side of the reaction tube, and with a very slow stream of nitrogen flowing, the furnace temperature was gradually raised to 425° C. A bright yellow sublimate, indicating decarboxylation, was observed at about 300° C. After one hour at 425° C., the tube contents were cooled under nitrogen. The yellow solid was washed out with hot xylene and the xylene was evaporated to give 0.088 gram (64% yield) of a bright yellow solid whose infrared spectrum was identical with that of pure benzocoronene.

We claim:

1. A process for the preparation of 1,12-o-phenyleneperylene which comprises reacting perylene and a molar excess of benzyne.

2. The process of claim 1 wherein said benzyne is generated in situ by reacting isoamyl nitrite and anthranilic acid.

3. The process of claim 1 wherein the benzyne:perylene mole ratio is in the range of from about 5:1 to 3:1.

4. A process which comprises (1) reacting perylene and a molar excess of benzyne to form 1,12-o-phenyleneperylene, (2) reacting said 1,12-o-phenyleneperylene, maleic anhydride, and a dehydrogenating agent to form 1,2-benzocoronene-7,8-dicarboxylic anhydride, and (3) reacting said 1,2 - benzocoronene - 7,8 - dicarboxylic anhydride and a decarboxylating agent to form benzocoronene.

5. The process of claim 4 wherein said benzyne is generated in situ by reacting isoamyl nitrite and anthranilic acid.

6. The process of claim 4 wherein the benzyne:perylene mole ratio is in the range of from about 5:1 to 3:1.

7. The process of claim 4 wherein said dehydrogenating agent is chloranil and the amount of maleic anhydride is sufficient to substantially dissolve the chloranil.

8. The process of claim 4 wherein said decarboxylating agent is soda-lime.

References Cited

UNITED STATES PATENTS 3,121,122 2/1964 Reimlinger _____ 260—668
3,132,187 5/1964 Turetzky _____ 260—688

DELBERT E. GANTZ, *Primary Examiner.*

C. R. DAVIS, *Assistant Examiner.*